Jan. 9, 1945.   A. A. GILLESPIE ET AL   2,366,851
BACKGROUND PROJECTOR
Original Filed May 22, 1939    5 Sheets-Sheet 1

Inventors
Albert Arnold Gillespie
Fred Hauser
Anthony G. Wise

By Lyon & Lyon, attys

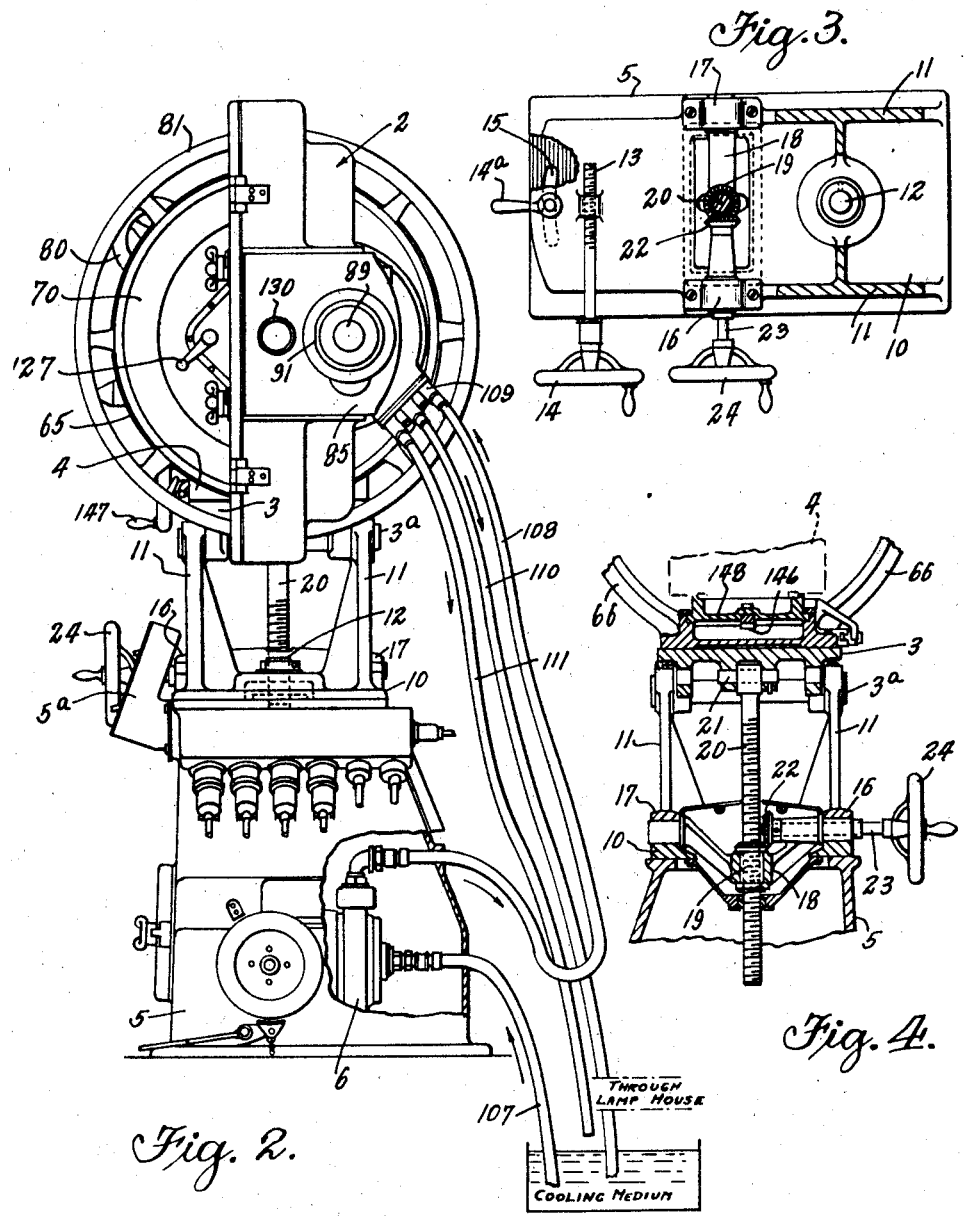

Jan. 9, 1945.  A. A. GILLESPIE ET AL  2,366,851
BACKGROUND PROJECTOR
Original Filed May 22, 1939   5 Sheets-Sheet 3
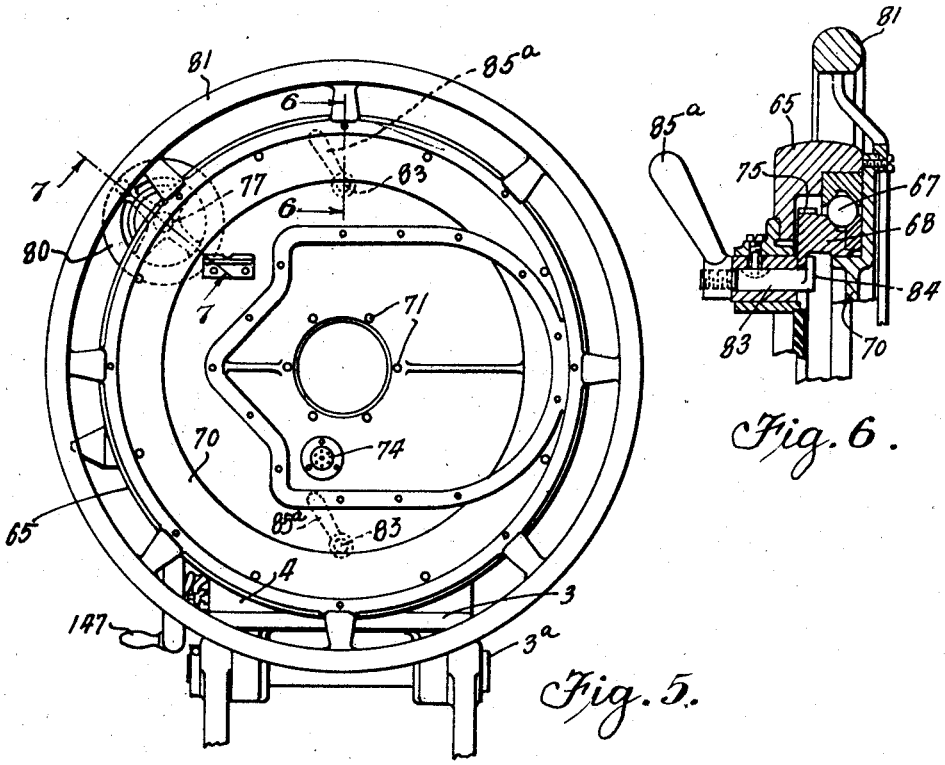
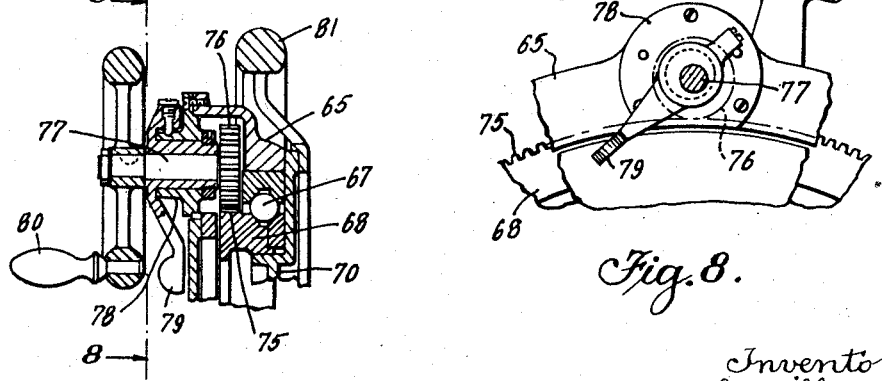
Inventors
Albert Arnold Gillespie
Fred Hauser
Anthony G. Wise
By Lyon & Lyon attys Jan. 9, 1945. A. A. GILLESPIE ET AL 2,366,851
BACKGROUND PROJECTOR
Original Filed May 22, 1939 5 Sheets-Sheet 4
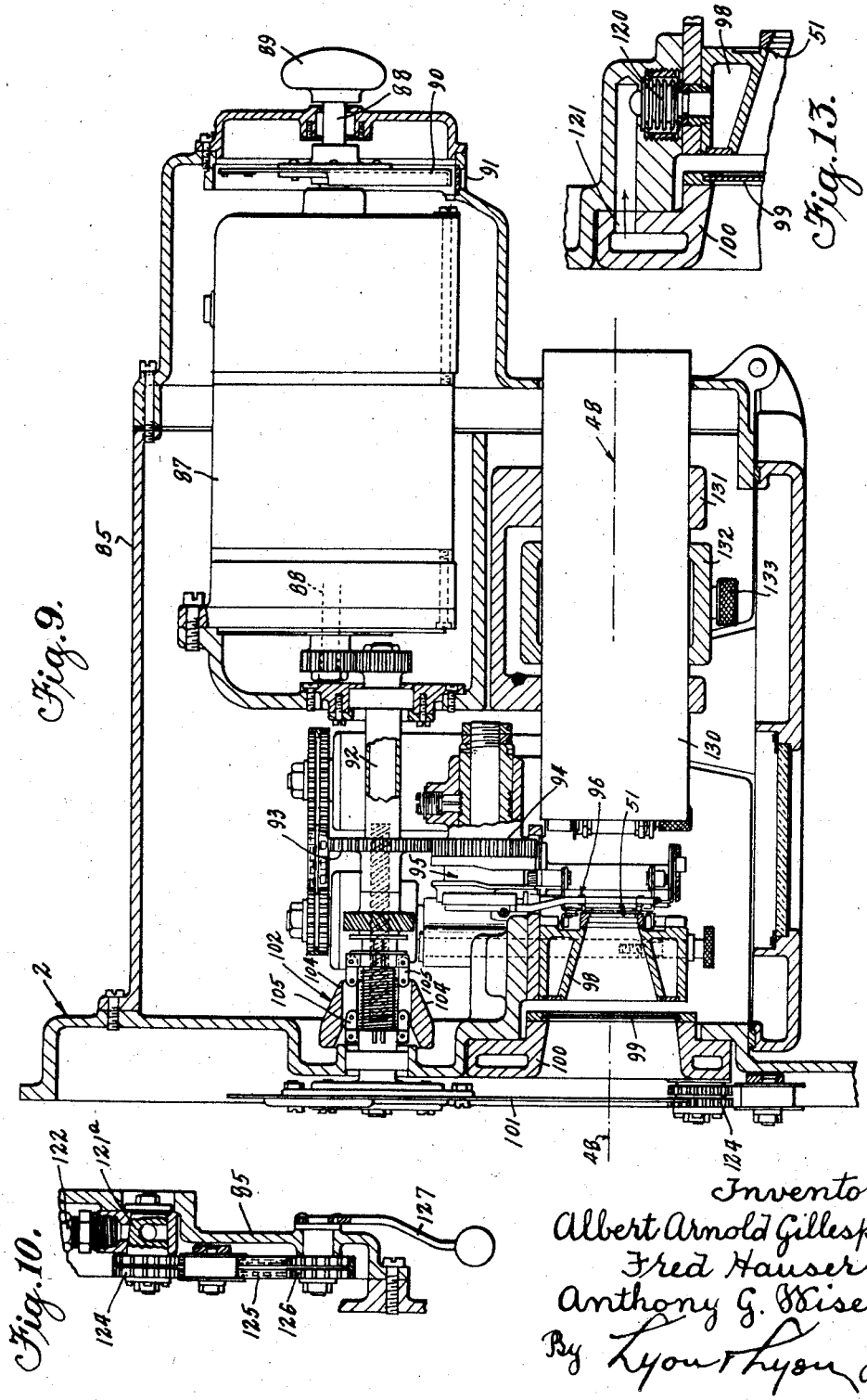
Inventors
Albert Arnold Gillespie
Fred Hauser
Anthony G. Wise
By Lyon & Lyon attys

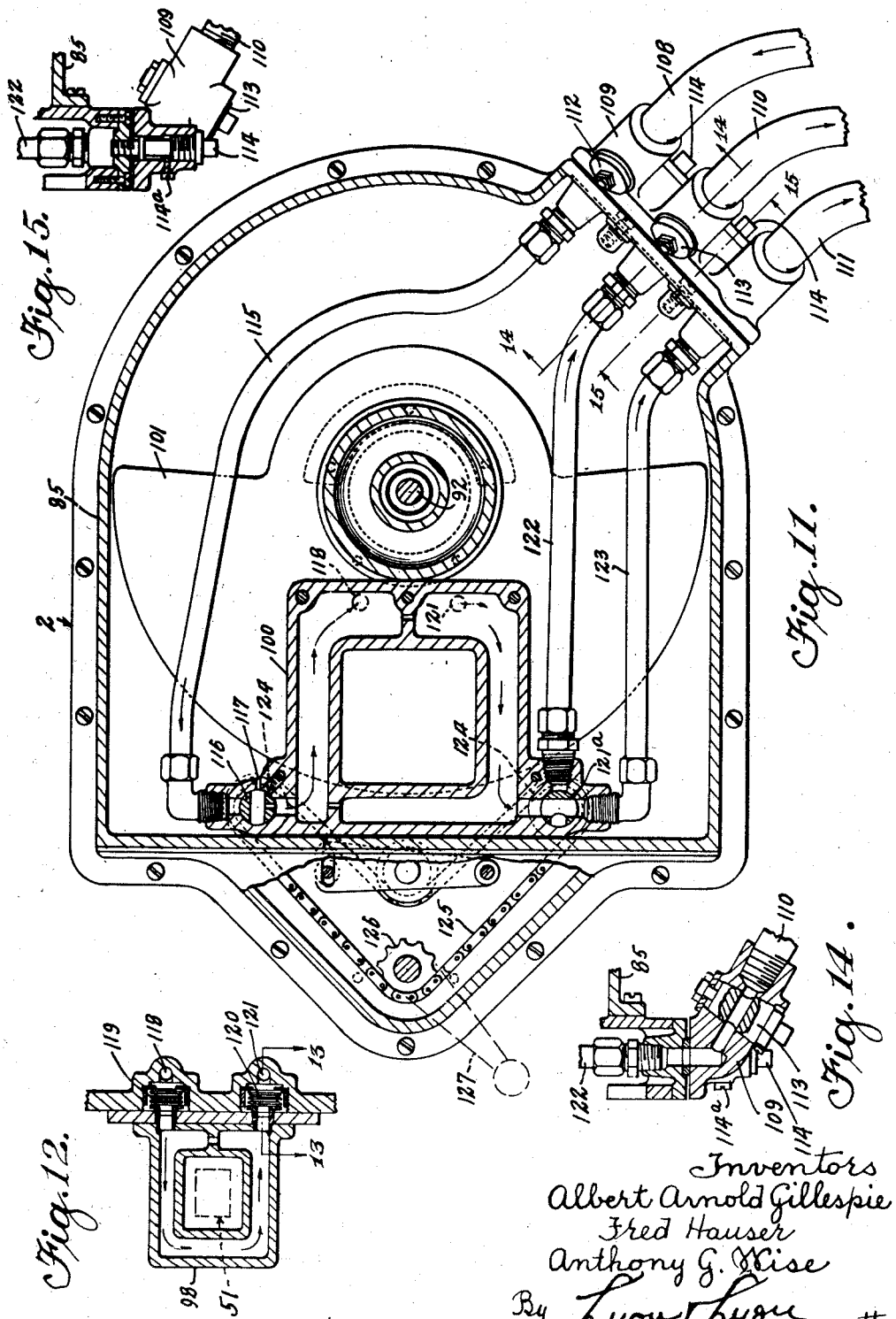

Patented Jan. 9, 1945

2,366,851

UNITED STATES PATENT OFFICE 2,366,851

BACKGROUND PROJECTOR

Albert Arnold Gillespie and Fred Hauser, West Los Angeles, and Anthony G. Wise, Los Angeles, Calif., assignors to Loew's Incorporated, a corporation of Delaware Original application May 22, 1939, Serial No. 274,910, now Patent No. 2,294,597, dated September 1, 1942. Divided and this application August 24, 1942, Serial No. 455,846

4 Claims. (Cl. 88—17)

This invention relates to an apparatus for projecting moving pictures on a screen to serve as a background for action operating in front of the background, which action is to be photographed by a camera and synchronized with the background projector.

This application is a division of our co-pending application, Serial No. 274,910, filed May 22, 1939, now Patent No. 2,294,597, dated September 1, 1942.

In the production of moving pictures it is frequently desirable to use as a background of the action photographed a screen upon which is projected a moving picture. The picture so projected on the screen must be synchronized with the operation of any camera utilized in photographing the action. Furthermore, various desired speeds of projection are required at different times. It is likewise essential that the focusing of the background on the screen should be easily and properly controlled by the photographer.

It is a general object of the present invention to provide an apparatus for projecting moving pictures on the screen in such a manner that the projected scene is adapted for use as a background of the action to be photographed by a camera in front of such projected scene.

It is a further object of the present invention to provide a background projector of this type which incorporates various desirable control features important for the successful utilization of such a projector.

One object of the present invention is to provide a background projector in which all of the essential operating and control mechanisms are incorporated either in the projector or the base mounting therefor, so that the same constitutes a self-sufficient unit capable of being readily transported and removed from any desired place of use.

A further object of the present invention is to provide a background projector of the type described, in which the projecting head is provided with a universal mounting with respect to its base whereby the projections may be made in any desired angle, and further to include in the projector means by which the scene to be projected may be rotated so as to provide a revolving scene back of the action to be photographed.

The projection of moving picture scenes as a background for action to be photographed generally requires the use of high power light sources, the use of which is accompanied by the danger of overheating or burning the film utilized, and further objects of the present invention are to provide such a background projector with means for properly cooling the aperture and other portions of the projector most susceptible to danger of overheating, and to include means for automatically shutting off the light from the film-actuated mechanism of the projector whenever the movement of the film is stopped.

The rotation of the projecting head for rotating the scene back of the actors is usually required in a portion of the projector, and in order to prevent rotation of the lines used in the cooling system it is necessary that the projector be provided with simple and rapid means for disconnecting the lines of the cooling system therefrom for such operations.

It is a further object of the invention to provide a cooling system of the type which may be readily disconnected from the supply lines whenever it is desired to rotate the projector head or where it is desired to make certain adjustments of the projector which render desirable the removal of the cooling system.

Various further objects of the present invention, together with additional advantages of the present invention, will best be understood from a description of a preferred form or example of a background projector embodying the invention, and for this purpose there is hereafter described with reference to the accompanying drawings such a preferred form or example of the invention.

In the drawings:

Figure 2 is a front elevation of the background projector partially broken away at the base to show connections of the pump to the water cooling system.

Figure 3 is a section on the line 3—3 of Figure 1 of the panning base.

Figure 4 is a vertical section on the line 4—4 of Figure 1 through the tilting mechanism.

Figure 5 is a section on the line 5—5 of Figure 1 of the rotary head for the projector.

Figure 6 is a fragmentary section on the line 6—6 of Figure 5 through one of the head locking screws.

Figure 7 is a section on the line 7—7 of Figure 5 through a micrometer adjusting device.

Figure 8 is a fragmentary plane view of the micrometer adjusting means and a portion of the rotary head taken on the line 8—8 of Figure 7.

Figure 9 is a horizontal section through the projector head with the cooling water shut-off means being broken away.

Figure 10 is a fragmentary section of the cooling water shut-off means broken away from Figure 9.

Figure 11 is a vertical section through the projector head disclosing details of the cooling system.

Figure 12 is a fragmentary section through the aperture of the water cooling jacket.

Figure 13 is a fragmentary section on the line 13—13 of Figure 12.

Figure 14 is a fragmentary section on the line 14—14 of Figure 11, through the outlet valve mechanism of the cooling system (the inlet valve mechanism being identical).

Figure 15 is a fragmentary section on the line 15—15 of Figure 11 through the cooling system.

Figure 1:
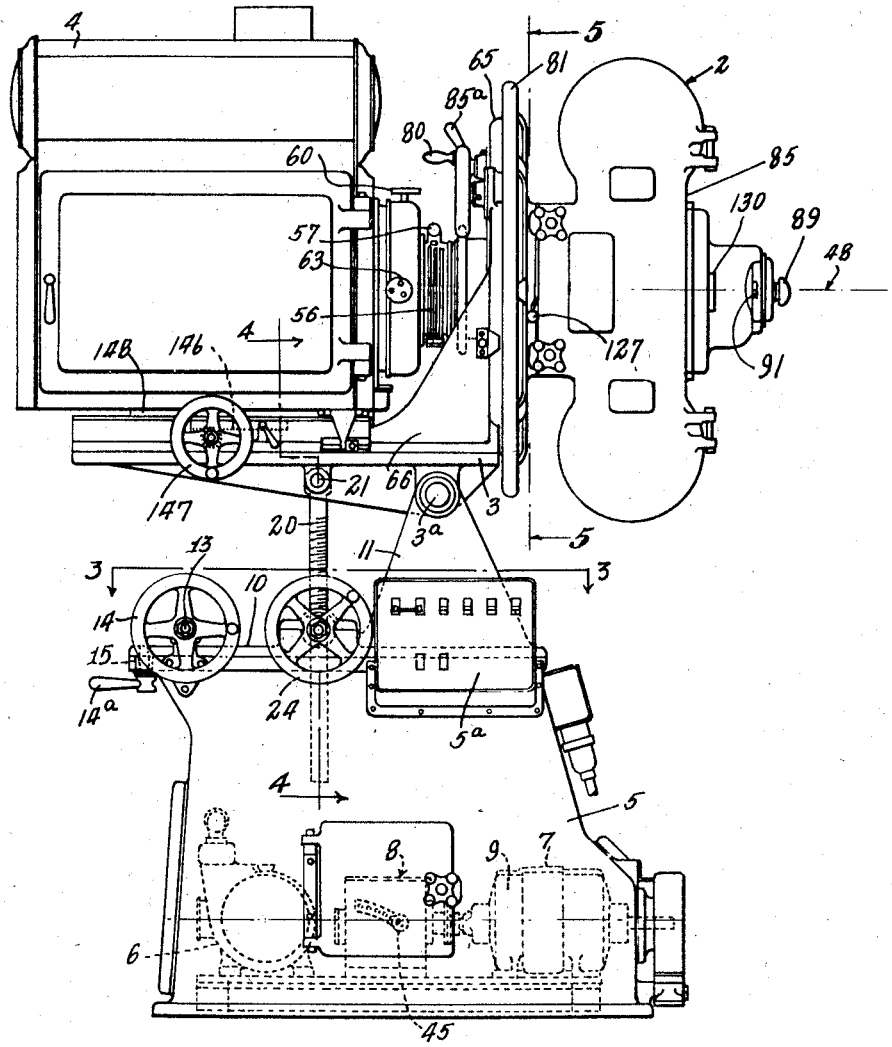
Figure 1 is a side elevation of the background projector.

Referring to the drawings, the background projector includes a projector head 2, which houses and includes aperture film moving mechanism and associated elements. The projector head 2 is mounted by a projector frame 3, which also supports a lantern housing 4. The lantern housing 4 may be of any usual or preferred construction, the details of which are not illustrated, and serves simply to provide a source of light for the apparatus. The projector frame 3 is pivoted as indicated at 3a to brackets mounted upon the top section of a panning base 10, which in turn is mounted on a base 5, which is so formed as to constitute a housing for certain of the essential driving and controlling apparatus of the projector, as well as a base for mounting certain indicating elements and control levers of the apparatus. Thus, the base 5 serves as a housing for pump 6 of the water-cooling system, for a motor 7 which drives certain speed control mechanism 8, for a distributor 9 which in turn controls the speed of the motors (located in the head 2 as hereinafter described) which control film and aperture moving mechanism. The base 5 also supports a certain switch and lever panel 5a, the purpose of which is hereinafter described.

The projector frame 3 is universally mounted with respect to the base 5 so that the scenes to be projected may be projected at any desired angle. For this purpose, the upper plate of the panning base 10 supports the brackets 11 upon which the projector frame 3 is pivotally mounted. The upper plate of the panning base 10 is journaled to the base housing 5 by a vertical pin 12 (Figures 2 and 3) and is movable about the axis of the pin 12 by means of an adjustment screw 13 (Figure 3) actuated by a hand wheel 14. The upper plate of the panning base may be locked to the base 5 in any suitable adjusted position by a lock lever 14a movable in an arcuate slot 15 in the base housing 5. For controlling the tipping of the projector frame 3 about a horizontal axis on the pivots 3a the panning base 10 is provided with bearings 16 and 17 which support trunnions provided on a spider 18, which supports nut 19 threaded to an elevating screw 20 pivoted as indicated at 21 to the projector base 3. The nut 19 is provided with gear teeth cooperating with gear 22 mounted on a shaft 23 extending through the bearing 16 to an operating wheel or handle 24. By the mechanism thus described it will be seen through operation of the hand wheel 24 that the projector frame 3 may be pivoted about a horizontal axis, which together with the movement about the vertical axis which can be effected through the hand wheel 14 permits a universal movement of the projector head.

The projector head 2 which contains and supports the lens system, as well as the film shutter moving mechanism, is rotatably mounted upon the projector frame 3 by means of a ring 65 (see Fig. 1) supported by brackets 66 on the projector frame 3. The ring 65 mounts roller bearings 67, which in turn engage an inner ring 68 to which the projector head 2 is attached. The projector head 2 includes the plate 70, which, as indicated at 71, is attached to the sleeve 54 and is provided with a separate aperture to permit the passage of light from the lens system to the aperture 51. The plate 70 supports a plurality of rings 72 which are engaged by spring-actuated electrical contact brushes 73, which are connected to leads 74, by which current from the distributor 9 may be brought to the projector head to be passed to the motors driving the film and shutter mechanism. The ring 68 is further provided with gear teeth 75 which connect with pinion 76 (Figure 7), which pinion is mounted on a shaft 77 eccentric in a bushing 78, which bushing 78 is provided with a lever 79, by which the same may be rotated to engage or disengage pinion 76 from teeth 75. Shaft 77 is connected with a hand-wheel 80, which may be employed for rotating the projector head with reference to the projector frame 3 whenever a slow adjustment or accurate adjustment of the position of the projector head 2 with reference to the frame is desired. When it is desired to more rapidly rotate the projector head of the apparatus, such for example as when it is desired to provide an appearance of a rotating background back of the actors to be photographed, the pinion 76 may be disengaged from the gear teeth 75 and the projector head then rapidly revolved by means of a wheel 81 attached to the head 2, as indicated in Figure 14.

Means are further provided by which the position of the projector head with reference to the frame 3 may be locked in any desired position. For this purpose, as indicated in Figure 6, the ring 65 of the projector frame 3 is indicated as provided with lock means 83, any number of which may be provided around the ring (two thereof being indicated in Figure 5), which lock member includes a jaw 84 axially movable by handle 85a into position to clamp or release the ring 65 of the projector head 2.

As indicated more particularly in Figure 9, the projector head 2 includes a soundproof housing 85 mounting a motor 87 for driving the film and shutter mechanism, the motor 87 being electrically connected to the contact rings 72 in any usual or desired manner. The motor 87 is provided with a shaft 88 which extends through the housing 85 and is there provided with a knob 89 for manually adjusting the position of the shutter and film-moving mechanism. Since the shutter movement of the projector is essentially hidden from view, and since it becomes frequently necessary to determine the position of the shutter of the projector for the purpose of aligning and synchronizing the same with the position of the shutter of the camera which may be employed in photographing action taking place in front of the scene formed by the projector, means are provided in the projector for indicating the position of such shutter and shutter moving mechanism. For this purpose, the shaft 88 of the motor 87 is provided with a disc 90 having a flange nut to indicate the position of the shutter and the housing 85 is provided with a window 91 by which the disc 90 may be viewed. Thus, the disc 90 constitutes what may be denominated a dummy shutter, and by observation of the position of the same the position of the actual shutter of the mechanism with reference to the aperture 51 may be determined.

The motor shaft 88 is indicated as geared to a stub shaft 92 having a gear 93 actuating the gear 94 of any suitable or desired film and shutter moving mechanism. Thus, the gear 94 is indicated as driving a cam system 95 which controls the film moving means 96 and which may be of any usual or preferred form.

The film is to be moved opposite the aperture 51, which is indicated as formed in a cooling jacket 98. Interposed between the aperture 51 and the source of light is provided a fire shutter 99 with which is associated a secondary cooling jacket 100. 101 indicates the shutter of the projector which may be of any desired type and which is indicated as driven by the stub shaft 92, which stub shaft 92 is indicated as being associated with a governor mechanism 102 controlling the fire shutter 99. As indicated in Figure 9, the fire shutter 99 is counterweighted by weighted lever 103 connected to the governor 102 by a pawl 106. The governor 102 consists of split weights 104 supported by link means 105, controlling collar 97, which makes contact with pawl 106. By the mechanism thus described, whenever the motor 87 of the projector is in operation the fire shutter 99 is automatically retracted. When, however, for any reason motor 87 of the projector is stopped, the governor automatically closes fire shutter 99, thereby shutting off the light from the film within the projector head 2 and eliminates the danger of the light igniting the film.

For cooling the aperture 51 and associated parts of the projector head the water pump 6 within the base of the projector (Figures 1 and 2) is connected by a line 107 to a source of cooling fluid so as to pass the same through line 108 to a bracket 109. The bracket 109 provides also connections for a water discharge line 110 and a drain line 111. The bracket 109 is so constructed as to be readily attached and detached from the projector head to install or remove the cooling system as the various operations require, and provides a single integral member for making connection to the lines 108, 110, and 111 for supporting and including the plug valves 112 and 113, and is provided with clamping screws 114 (Figure 15) by means of which the bracket may be readily clamped to the projector head 2. Set screws 114a are indicated for the purpose of locking the bracket 109 in position. The inlet line 108 and outlet line 110 are respectively provided with plug valves 112 and 113 in the bracket 109, which may be closed whenever it is desired to remove the water cooling supply lines.

Within the projector head 2 the inlet line 108 connects with a line 115 leading to a valve 116, which is of the plug cock type and which is provided with a venting port 117 so that it is movable to one position to allow flow of cooling fluid therethrough and movable to a second position, i. e., that shown in Figure 11 to shut off the flow of cooling fluid and vent the cooling passages within the projector head 2 to the aperture through the vent port 117.

From the plug cock valve 116 the cooling fluid enters first the upper portion of the cooling jacket 100 (Figure 11), from which it passes to a port 118 (Figures 11 and 12) to a Sylphon 119 into the cooling jacket 98 (Figures 9 and 12). The cooling fluid flows through the jacket 98 and thence through a Sylphon 120 and port 121 (Figure 12) entering the lower portion of the cooling jacket 100 (Figure 11). From the lower portion of cooling jacket 100 cooling fluid may flow through the plug cock valve 121a, which is designed to make connection with either line 122, connecting in turn with outlet line 110, or with line 123 making connection with the drain tube or line 111.

Preferably, means are provided for intercontrolling the valves 116 and 121a, and for this purpose the plug cock valves are each provided with sprockets 124 over which there is trained a chain 125, which likewise passes over an adjusting sprocket 126 connected with a hand lever 127. By such means the two valves 116 and 121 are interconnected so that by a single operation they may be moved either to a drain position, as indicated in Figure 1, or to a second further position in which they provide for the flow of cooling fluid to the water jackets of the head. The cooling system thus described provides means for cooling the more exposed portion of the head of the projector from the heat developed by the light from the lantern housing 4, and provides also for ready draining of water from the head and disconnection of the lines leading to the pumps so as to permit rotation of the head.

While the particular form of projector herein described is well adapted to carry out the objects of the present invention, it is to be understood that various modifications and changes may be made without departing from the principles of the present invention, and the present invention includes all such modifications and changes as come within the scope of the appended claims.

We claim:

1. A background projector including a base mounting, a projector head frame pivotally mounted on said base and in turn rotatably supporting a projector head, said projector head including film shutter actuating mechanism for controlling the movement of the film by an aperture, cooling jackets disposed adjacent said aperture, inlet discharge and drain lines to said cooling jackets, said lines including valve means and joint actuating means for said valve means for moving the same jointly to either a cooling position or draining position, and a bracket detachably connected with said head and connecting within said head with said cooling jackets, said bracket mounting inlet, outlet, and drain lines for said cooling jackets.

2. A background projector containing a base member mounting a cooling pump for the projector, a projector head revolvably mounted with respect to said base member and containing cooling jackets, lines for flow of cooling fluid from said pump to said projector head, and a bracket supporting said lines and operative for ready detachable connection with said projector head, whereby the cooling pump may be readily disconnected from said projector head for rotation of the projector head.

3. A background projector including a revolvably mounted projector head housing the film shutter moving mechanism, aperture, and lens system, said projector head having a plurality of cooling jackets interposed between the condenser system and aperture, inlet and outlet and drain lines for said cooling jackets, valve means connecting the cooling jackets to either the inlet and outlet lines or to the drain line, and common means for actuating said valve mechanisms.

4. A background projector including a revolvably mounted projector head housing the film shutter moving mechanism, aperture, and lens system, said projector head having a plurality of cooling jackets interposed between the condenser system and aperture, inlet and outlet and drain lines for said cooling jackets, valve means connecting the cooling jackets to either the inlet and outlet lines or to the drain line, common means for actuating said valve mechanisms, inlet, outlet, and drain lines external to said head, a common bracket for supporting said external lines and connecting the same with the inlet, outlet, and drain lines within the projector head, and means for detachably connecting said bracket to said projector head.

ALBERT ARNOLD GILLESPIE.
FRED HAUSER.
ANTHONY G. WISE.